UNITED STATES PATENT OFFICE.

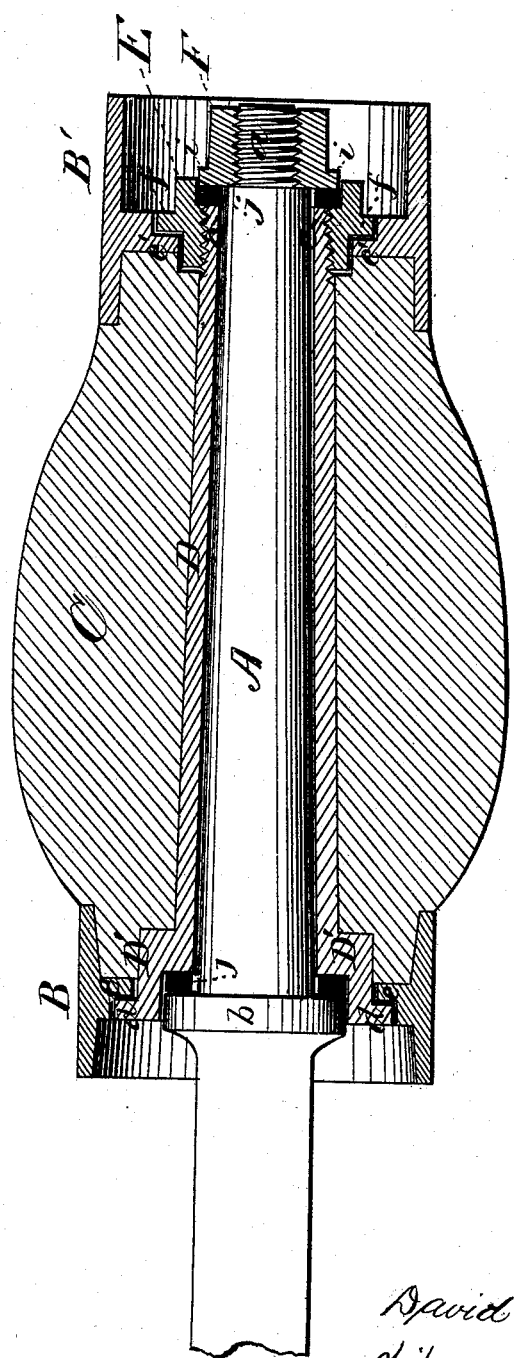

DAVID O. HOLMAN, OF ADAMS, NEW YORK.

IMPROVEMENT IN VEHICLE-HUBS.

Specification forming part of Letters Patent No. 171,284, dated December 21, 1875; application filed November 27, 1875.

*To all whom it may concern:*

Be it known that I, DAVID O. HOLMAN, of Adams, in the county of Jefferson and State of New York, have invented a new and valuable Improvement in Hubs; and I do hereby declare that the following is a full, clear, and exact description of the construction and operation of the same, reference being had to the annexed drawings making a part of this specification, and to the letters and figures of reference marked thereon.

The figure of the drawing is a representation of a longitudinal central section of my hub.

This invention has relation to improvements in hub boxes and bands for vehicle-wheels; and the nature of the invention consists in the arrangement and novel construction of the various devices used, whereby very desirable and important results are obtained in confining the bands upon the hub, and in preventing dust from penetrating into the box, as will be hereinafter more fully explained and claimed.

In the annexed drawings, the letter A designates an ordinary axle-arm, having at its end a screw-threaded rabbet, $a$, and at its other end, near its junction with the body of the axle, a collar, $b$. B B' indicate metallic bands, which are applied respectively upon the inner and outer ends of a hub, C. D represents a metallic axle-box, which is passed into the hub in the usual manner, and is provided upon its outer end with a male screw-threaded end, $c$. It has also upon its inner end a cylindrical enlargement, D', which is recessed into the hub, and is provided with an annular flange, $d$, upon its outer end, which flange is at right angles to the long axis of the box, and when the latter is passed into the hub abuts forcibly against an annular shoulder, $e$, formed on the inner surface of band B; consequently, when the arm is confined in the hub by means hereinafter described, the said band will be prevented from becoming detached under any circumstances from the hub. Band B' on the outer end of hub is also provided with an annular shouldered flange, $e'$, against which an annular flange, $f$, on nut E will abut when the latter is secured upon the screw-threaded end $c$ of box D.

When this nut is forcibly set up it will not only confine the band B' to the hub, but will also clamp the inner band B upon its seat, through the action thereon of the flange $d$ on the enlargement D' of the box through the strain produced by clamp-nut E.

The effect of this construction is that the axle-box and the bands are rigidly secured to the hub by one and the same nut E; but no provision has as yet been shown for holding arm A to its engagement with the hub.

This is accomplished by means of a nut, F, which is applied upon the screw-threaded rabbet $a$ on the end of arm A, and is provided with an annular flange, $i$, adapted to be received, and fit snugly, in the open outer end of nut E.

In order to prevent the clacking noise usual in hubs having metallic boxes and iron axle-arms, preferably, leather washers $j$ are interposed between the collar $b$ on the axle-arm and the bottom of the enlargement D' on the inner end of box D, and on the end of the arm between the outer end of the box and nut F, before alluded to.

The effect of this construction is that all disagreeable noise is prevented, and the penetration of even the finest particles of dust between the arm and hub is effectually obviated, while, at the same time, the bands B B' will be absolutely prevented from getting off the hub casually and being lost, either because of shrinkage of the latter or for any other reason.

What I claim as new, and desire to secure by Letters Patent, is—

In a vehicle-hub, the combination, with band B, having inner annular flange $e$, and band B', having a similar flange, $e'$, of the axle-box D, having cylindrical enlargement D' with annular flange $d$ and a screw-threaded end, $c$, and the clamp-nut E, having exterior flange $f$ abutting against flange $e'$ of the band B', whereby the said bands and axle-box are attached to the hub, substantially as specified.

In testimony that I claim the above I have hereunto subscribed my name in the presence of two witnesses.

DAVID O. HOLMAN.

Witnesses:
ELISHA T. LITTLEFIELD,
WILBUR N. SMITH.